Figure 1:
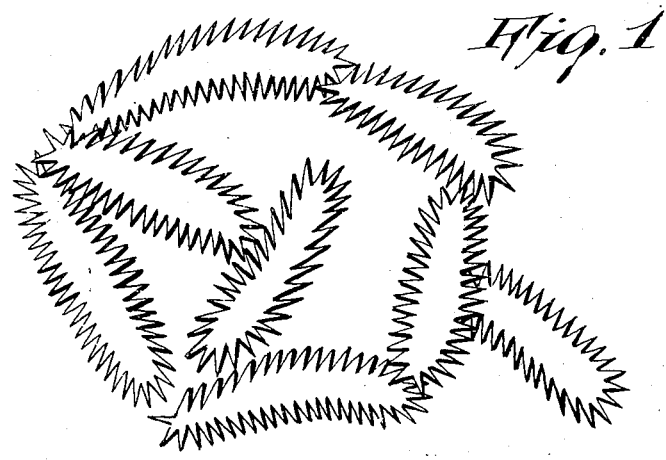

April 29, 1958 F. PETERS 2,832,813
ELECTRODE FOR AN ALKALI STORAGE CELL
AND A PROCESS OF MANUFACTURING SAME
Filed Aug. 27, 1953

INVENTOR.
FREIMUT PETERS
BY Armand G. Mystern
Attorney

United States Patent Office 2,832,813
Patented Apr. 29, 1958

2,832,813

ELECTRODE FOR AN ALKALI STORAGE CELL AND A PROCESS OF MANUFACTURING SAME

Freimut Peters, Hagen, Westphalia, Germany, assignor to Accumulatoren-Fabrik Aktiengesellschaft, Frankfurt am Main, Germany Application August 27, 1953, Serial No. 376,973

Claims priority, application Germany August 30, 1952

6 Claims. (Cl. 136—24)

The present invention relates to an electrode for an alkaline storage cell and a process of manufacturing same, and more particularly to a process of manufacturing a negative electrode for an alkali storage cell.

It has been suggested to manufacture in a simplified manner negative electrodes for alkaline storage cells by consolidating under pressure to an inherently stable body the active mass serving for manufacturing the negative electrode and consisting of a metal such as cadmium deformable under pressure and susceptible of cold welding, said mass containing a low percentage of an oxide or hydroxide.

By the pressure treatment a continuous porous body is produced which consists of a cemented or welded metallic component not participating in the electrochemical process, whereas the originally present component of cadmium oxide or hydroxide is in the main electrochemically active, i. e. current storing and current supplying.

In order to replace the cadmium fixed in the body and not participating in the electrochemical processes by another less expensive metal and thus to improve the exploitability of the unit weight of the active starting material, it has been furthermore suggested to loosen the active mass by an electrochemically inactive metal such as nickel in the form of powdered nickel.

The mixture of nickel with the active material has then to be chosen in such a manner that the portion of the active mass not participating in the electrochemical processes is sufficient to cement or weld the inactive nickel to form a stable, electroconductive structure. In order to attain this, for instance powdered nickel can be added to the active mass up to 150% of the weight thereof.

As an active material for the manufacture of such pressed electrodes, electrolytically manufactured cadmium mass without or with addition of an expander, particularly nickel, is suitable.

It has now been found that instead of the electrochemically inactive nickel, according to the present invention e. g. such finely powdered metals can be advantageously used which are capable of becoming at least partly electrochemically activated. For instance, to the active material can be added, before the pressing, nickel iron powder, copper nickel powder as mixtures or alloys, or iron powder. These components, which are partly activated, thus fulfill a double task and are therefore superior to the electrochemically inactive admixtures.

The active material, for instance a cadmium mass with the usual expanders, particularly nickel, is loosened by the addition of the powdered metal so that the exploitation of the mass is increased.

Furthermore, the activating portion of the added metal powders, which naturally forms the outer parts of the powdered particles and is in intimate contact with the active material owing to the strong pressure exerted initially, acts as an expander therefor. This expanding effect becomes possible by the fact that the activating components are not permanently fixed to their place, as is cadmium, which in the form of its oxide or hydroxide is insoluble in alkaline solutions, but are capable of working their way gradually into the active material. This has to be attributed to the ability of these activating components to form with the alkaline electrolyte, under certain conditions, soluble compositions and to separate from the latter on the electrodes.

Such an activation of the supporting structure has been observed with sinter electrodes having a structure of iron or nickel-iron impregnated with cadmium mass. Furthermore, it is known that the reaction products of copper formed during the discharge are dissolved in lye with a blue color and that the copper is precipitated once more during the charging.

This expanding effect due to the activation of the metal powder present in the pressed material has as a consequence in addition to the loosening effect of the admixture, a further improvement of the exploitation of the mass. The amount of the admixture of powders to the active material according to the present invention is limited only by the fact that the constituent of the active material not participating in the electrochemical processes has to fulfill the task of cementing or welding the foreign components to a structure having an inherent stability. This quantitative proportion of the foreign components can amount e. g. to 150% of the proportion of the active material, it being understood that this is not to be regarded as an upper limit.

In which way the metal powders are produced which are used according to the present invention as an addition to the active materials, is immaterial for the present invention.

The solidification of the pressed body can, of course, be aided by an increase of the temperature of the material undergoing solidification during the pressing; this increase of temperature, however, must not lead to a diminution of the activating properties. In equal manner the process can be applied to other metals having properties similar to cadmium, such as lead, stannum, zinc.

Tests have further shown that also active materials rich in oxygen or consisting only of oxides or hydroxides can be condensed so far that they form an inherently stable, porous body, which can be used permanently and as a negative electrode of an alkaline storage cell without the sheathing of the active material which is usual in pocket electrodes. It is known in the art to produce by pressing negative electrodes of alkaline storage cells from cadmium hydroxide and copper powder. Here, the pressing serves for interlocking the powdered particles having preferably the form of needle-shaped or dendritic microscopic crystals.

However, by the interlocking only a loose coherence is mechanically obtained which can be easily loosened since the individual powdered particles do not intergrow with one another but only touch one another more or less.

In order to render possible an interlocking of the dendritic crystals, care must be taken to preserve the dendritic structure during the mixing operation anteceding the pressing. However, with an interlocking according to the known suggestions, the negative plate grows soft in the course of this treatment which takes a longer time; therefore, the plate becomes spongy and its outer surfaces are washed off so that it loses in capacity.

If, however, it is intended to manufacture a negative electrode having a longer life, it is necessary according to the present invention to apply a very high pressure, for instance, one from 700–1400 kg. per square cm. By this, the individual powdered particles approach one another so as to have a minimal distance from one another and are brought to an intimate and large surface contact exceeding the contact obtained with a mere interlocking.

By this, the following novel effects are obtained:

By the electrochemical reduction of the oxides or hydroxides during charging at first a highly dispersed metal powder is produced which, however, is not stable in this form but is rendered coarser by a collective crystallization.

Owing to the close proximity of the powdered particles due to the direct and large-surface contact, the highly dispersed, initially almost atomically dispersed metal powder particles coalesce with one another because of the collective crystallization. That means that the collective crystallization combines not only the metal atoms of a powdered particle, but also owing to the close vicinity the metal atoms of adjacent particles, so as to obtain coarser particles. In this manner a continuous, metallic, highly porous structure is formed having a portion participating as an electrochemically active part in the phenomena of the current storage and current supply, the remainder amounting according to experience to 50–60% being electrochemically inactive and thus remaining metallic and serving as a porous carrier support for the active material.

It is immaterial for the present invention what structure the powders have before the pressing operation.

It is thus possible according to the present invention to influence by a strong pressure not only oxygen-poor powders of active material, but also oxygen-rich active materials in such a manner that they form a continuous and form-stable structure, not by the pressing, but by the charge thereof.

According to the present invention thus also active materials which formerly were not usable as electrodes of alkaline storage cells without a supporting mantling thereof, can be used as form-stable pressed structures without this mantling. Not only cadmium oxide and cadmium hydroxide can be used as the negative active material in the starting material for not reinforced negative electrodes for alkaline storage cells; other metal oxides, hydroxides and mixtures thereof, suitable for the production of negative electrodes, such as zinc oxide, zinc hydroxide, iron oxide and iron hydroxide can be used. These negative active materials will be called metal-oxygen compounds.

In order to improve the efficiency of the material, it is preferable to loosen the active material by admixing a conductive material in form of a powdered metal. This applies as well to active materials consisting largely or solely of metal oxygen compounds. For this purpose, the same metal powders are applicable which have been suggested as admixtures to oxygen-poor active materials.

Powders suitable for the purpose in question are: Electrochemically inactive powders, e. g. consisting of nickel or suitable nickel compounds; or metal powders which become at least partly activated by electrochemical action, e. g. powders consisting of nickel iron, nickel copper in the form of mixtures or alloys, or iron.

By the loosening admixture which may amount for instance up to 150% of the quantity of active material without this being intended to give an upper limit, the efficiency of the material is improved. By the collective crystallization setting in at the electrochemical reduction of the oxygen-rich powders, of the thus produced highly disperse metal powders and by the intimate contact obtained by the application of a high pressure, the admixed metal powders are participating in the formation of continuous binding of the basic metal of the active material, for instance cadmium, and are thus made part of the resultant highly porous structure.

In this manner, an effect is obtained of a welding and agglomeration similar on principle to the sintering of loosely heaped-up metal powders from which the highly porous electrode structures are produced as carriers of the active material of alkaline storage cells.

The admixed metal powders form, in combination with the metallic portion of the active material not participating in the electrochemical processes, the porous structure offering a carrying base of large surface for the electrochemically working parts of the active material.

Figure 2:
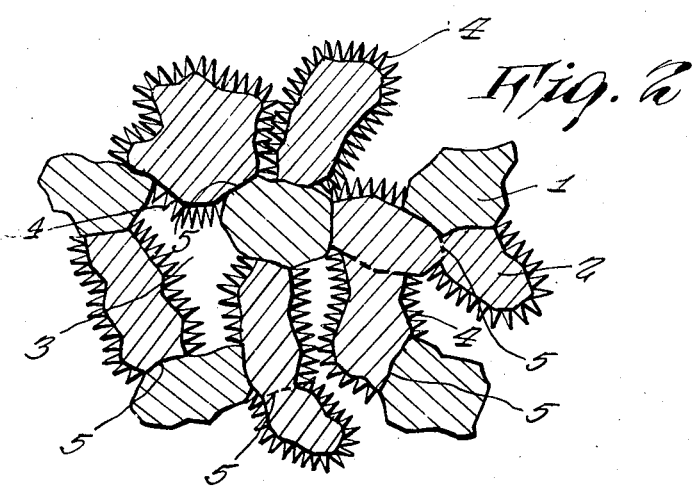

The invention will now be described with reference to the accompanying drawing in which Fig. 1 shows a section of a pressed plate of conventional structure, whereas Fig. 2 shows a section of a plate according to the invention.

Figure 3:
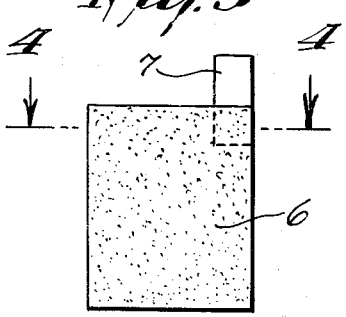
Figure 4:
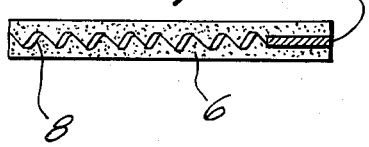

Figs. 3 and 4 illustrate, in elevation and section on line 4—4 respectively, a plate containing the active material according to the invention.

As may be seen from Fig. 1, the particles contained in a conventional pressed plate are held together mainly by an inter-meshing somewhat similar to that of the teeth of a gearing.

A pressed plate according to the invention is shown in Fig. 2. This comprises particles 2 of active material and particles 1 of metal powder which are welded together at lines designated by 5. The metal core of particles 2 is coated by a layer 4 of electrochemically active substance. The particles 1 of the base metal and particles 2 of the active material form together a unitary structure in which hollow spaces 3 are enclosed.

A plate 6 is shown in Fig. 3 which is made up of the material according to the invention; 7 designates the connecting lug. Fig. 4 shows the plate in section with a metallic insert 8 for reenforcement.

The present invention has the advantage that the costly and complicated sintering process is replaced by a simple pressing process and that then an agglomeration of the components of the pressed bodies is carried out at normal working temperature and in the course of the necessary starting of the operation of the storage cell.

The pressing of the active material consisting entirely or largely of metal-oxygen compounds is carried out generally at room temperature. However, the working temperature can be increased so far that it does not impede the electrochemical activity of the electrodes.

In order to increase the stability, the pressed bodies according to the invention can be provided with metallic inserts in form of e. g. fabrics, metal wool, as shown in Fig. 4; or, the edges may be bordered by binding strips and provided with current lugs, the leading in and out of the current being performed by parts which are either contained in the inserts and/or binding strips from the beginning, or subsequently fastened to the same.

The single pressed plates can be united in suitable manner known in the art, so as to form sets of electrodes or connected to a larger carrier in sets forming a multiple plate.

The present invention is by no means limited to the embodiments described hereinbefore and it should be understood that other applications thereof are to be considered as part of the present invention.

What I claim is:

1. A negative electrode of an alkaline storage cell which electrode comprises a highly compressed body, said compressed body consisting of a conductive metal and a negative active material containing a metal compound selected from the group consisting of the oxides and hydroxides of zinc, iron, and cadmium and of mixtures thereof, said electrode body obtained by compressing a mixture of said conductive metal and said active material in finely powdered form at a pressure between about 700 kg./sq. cm. and about 1400 kg./sq. cm. and by solidifying said compressed body into a porous metal electrode structure by cathodic treatment in an alkaline electrolyte subsequent to said pressure treatment, said metal compound being present in said compressed electrode body before said cathodic treatment in an amount between about 50% and about 150% of said conductive metal powder.

2. A negative electrode of an alkaline storage cell according to claim 1, in which said conductive metal is selected from the group consisting of iron, copper, nickel, mixtures thereof, and alloys thereof.

3. A process of manufacturing a negative electrode of an alkaline storage cell, which process comprises mixing a conductive metal powder with a metal compound selected from the group consisting of the oxides and hydroxides of zinc, iron, and cadmium, and mixtures thereof, said metal compound being present in said mixture in an amount between about 50% and about 150% of said conductive metal powder, subjecting the resulting mixture to a pressure between about 700 kg./sq. cm. and about 1400 kg./sq. cm. so as to obtain a continuous porous compressed body, and subjecting said body to an electrochemical forming process by cathodic treatment in an alkaline electrolyte so as to solidify the body into a porous metal electrode structure.

4. A process of manufacturing a negative electrode according to claim 3, wherein the conductive metal powder contains nickel powder.

5. A process of manufacturing a negative electrode according to claim 3, wherein the conductive metal powder is selected from the group consisting of iron powder, copper-nickel powder, iron-nickel powder, mixtures thereof, and powders of alloys thereof.

6. A process of manufacturing a negative electrode according to claim 3, wherein the conductive metal powder is a mixture of nickel powder and cadmium powder.

References Cited in the file of this patent

UNITED STATES PATENTS

| 2,672,494 | Fleischer | Mar. 16, 1954 |
| 2,694,743 | Ruskin et al. | Nov. 16, 1954 |

FOREIGN PATENTS

| 5,545 | Great Britain | Oct. 31, 1912 |
| 608,896 | Great Britain | Sept. 22, 1948 |